1979 年 Jun. 19, 1979

United States Patent [19]
Novak

[11] 4,158,773
[45] Jun. 19, 1979

[54] SHOCK-RESISTANT SCINTILLATION DETECTOR

[75] Inventor: William P. Novak, Middlefield, Ohio

[73] Assignee: Bicron Corporation, Newbury, Ohio

[21] Appl. No.: 820,107

[22] Filed: Jul. 29, 1977

Related U.S. Application Data

[63] Continuation-in-part of Ser. No. 700,406, Jun. 28, 1976, abandoned.

[51] Int. Cl.² .............................................. G01T 1/20
[52] U.S. Cl. ................................ 250/361 R; 250/368; 250/521
[58] Field of Search ................... 250/256, 261, 361 R, 250/362, 368, 483, 485, 521

[56] References Cited

U.S. PATENT DOCUMENTS

| | | | |
|---|---|---|---|
| 2,721,274 | 10/1955 | Garbellano et al. | 250/485 X |
| 3,426,195 | 2/1969 | Menefee et al. | 250/485 |

*Primary Examiner*—Davis L. Willis
*Attorney, Agent, or Firm*—Bosworth, Sessions & McCoy

[57] ABSTRACT

A unique scintillation detector unit is disclosed which employs a special light transfer and reflector means that encases and protects the scintillator crystal against high g forces. The light transfer means commprises a flexible silicone rubber optical material bonded between the crystal and the optical window and having an axial thickness sufficient to allow the scintillator to move axially inside the container under high g forces without destroying the bonds. The reflector means comprises a soft elastic silicone rubber sleeve having a multiplicity of closely arranged tapered protrusions radiating toward and engaging the periphery of the scintillator crystal to cushion shocks effectively and having a reflective material, such as aluminum oxide powder, in the spaces between the protrusions. The reflector means provides improved shock absorption because of the uniform support and cushioning action of the protrusions and also provides the detector with high efficiency. The silicone rubber composition is specially compounded to include a large amount of aluminum oxide which enables the rubber to function effectively as a light reflector.

31 Claims, 5 Drawing Figures

SHOCK-RESISTANT SCINTILLATION DETECTOR

REFERENCE TO RELATED APPLICATION

This application is a continuation-in-part of my co-pending allowed application Ser. No. 700,406, file June 28, 1976 and now abandoned, the disclosure of which is incorporated herein by reference.

BACKGROUND OF THE INVENTION

The present invention relates to scintillation detectors for measuring gamma ray adiation and more particularly to an improved form of scintillation detector having a unique construction which provides exceptional shock resistance while maintaining high detection efficiency.

Thallium activated sodium iodide crystals are very effective gamma ray detectors. Such crystals have for many years been used in scintillation detectors which are employed in the oil industry for deep well logging. These detectors are lowered into deep bore holes in special tools having relatively small diameters. Their ability to detect gamma rays makes it possible to analyze surrounding rock strata. When they are lowered to different depths they provide an excellent means for analysis of geological formations at each test bore hole.

For many years sodium iodide crystals for deep bore hole well logging have been enclosed or encapsulated in metal tubes having relatively small diameters. An optical window is provided to close one end of the tube, and a thin optical coupling is provided between the sodium iodide crystal and the window. The crystal has a diameter less than the internal diameter of the tube and is surrounded by a highly reflective material, such as aluminum powder. In a conventional scintillation detector, a spring assembly is provided at the end of the metal tube opposite the optical window to bias the crystal toward the optical coupling at the window.

In conventional assemblies where the optical coupling is a fluid, such as a heavy silicone oil, an O-ring is placed around the crystal near the window to provide a seal. Another O-ring is placed at the opposite end of the crystal to prevent escape of the reflector material and to help center the crystal in the tube. Sodium iodide crystals are brittle, weak in tensile strength, have no elasticity, and therefore have little shock resistance. Consequently, prior to this invention, the shock resistance of scintillation detectors was limited, and they could be broken or seriously damaged, for example by shocks of 50 g's or more. They were unsatisfactory for use where high shocks were to be encountered such as 100 g's or more.

For this reason, prior designs were not satisfactory for larger scintillation detectors employing sodium iodide crystals of substantial weight. For example, scintillation detectors of conventional construction did not have adequate shock resistance if the crystal had a substantial diameter, such as 1.5 inch or more, and a substantial length, such as 12 inches or more.

If a conventional scintillation detector of such size were used for deep well logging, the expected useful life would be relatively short because of the likelihood of premature shock damage. For example, 100-g shock load perpendicular to the axis of the steel cylinder could cause the sodium iodide crystal to bend between the O-rings at opposite ends of the crystal and to fracture the crystal. A 100-g shock load in the direction of the axis away from the optical window could cause the sodium iodide crystal to compress the spring a substantial amount and thereby destroy the optical coupling between the crystal and the glass window. If the crystal were bonded so well that it did not break the optical coupling, the g forces would be likely to exceed the tensile strength of the crystal so that is could be torn apart.

If a 100-g shock load is applied to a conventional detector in the opposite direction along the axis of the crystal toward the glass window, the crystal and/or the glass would be subject to fracture because the optical coupling provides no protection.

Thus, in scintillation detectors of the type known prior to this invention, there was no satisfactory solution to the shock problem when the sodium iodide crystals were large and the shock loads approached 100 g's. The problem could not be solved by increasing the strength of the spring as the crystal size increased because this would result in too much pressure on the glass window and would transmit excessive shocks to the crsytal.

SUMMARY OF THE INVENTION

The present invention overcomes the problems discussed above and provides a simple, durable scintillation detector which may be used in various environments where the mechanical shocks may be 100 g's or greater, as in space vehicles or deep test bore holes. The improvement in the useful life of the detector is important because the detector is part of a semi-permanent assembly which can not be disassembled or repaired at the site. In a space vehicle or high altitude vehicle, for example, repairs are not feasible. While care can be taken to minimize shock forces when using oil-well bore-hole tools, the fact is that they are treated roughly in handling and must face extremely high shock resistance to avoid catastrophic damage.

In the scintillation detector of this invention the sodium iodide crystal is mounted so that it may move a substantial distance axially within the metal cylinder and so that it has more room for lateral movement than in previous constructions. An important feature of the invention is the provision of a silicone rubber light pipe of substantial axial dimension which is permanately bonded to the crystal and to the glass window and which is capable of absorbing axial shocks when heavy g forces are applied. The silicone rubber light pipe is adapted to stretch or deform and to provide the crystal with a high degree of protection. Another important feature of this invention is the provision of shock absorbing material surrounding the crystal together with reflecting means at the peripheral surface of the crystal. The shock absorber is a tube or sleeve of deformable rubber and is preferably a silicone elastomer molded to provide a multiplicity of tapered obtuse protrusions.

The silicone rubber preferably contains a substantial amount of aluminum oxide powder so that sleeve reflects at the areas which engage the scintillator crystal. The special molded silicone rubber sleeve provides optimum cushioning and at the same time provides the reflective means needed to enable the unit to function efficiently. A similar arrangement is preferably provided at the bottom end of the scintillation crystal by a circular disc of molded silicone rubber having the closely arranged tapered protrusions engaging the flat end of the crystal.

In the manufacture of scintillation detectors according to the present invention, a silicone rubber light pipe or optical coupling, which may have an axial thickness of 0.4 to 0.6 inch or greater, is bonded at one face to the end of the sodium iodide crystal and is bonded at its opposite face to the optical window. The resulting cylindrical assembly is placed in the stainless steel cylinder 5 and surrounded by the molded silicone rubber sleeve whose tapered protrusions engage the crystal around the periphery to hold it coaxial with the cylinder. A hermetic seal is provided around the window, and the spaces between the protrusions of the sleeve can be filled with a reflective material, such as magnesium oxide or aluminum oxide powder. A flat disc of molded silicone rubber having similar protuberances is then placed against the end of the crystal with aluminum powder preferably packed in the spaces between the protuberances. A suitable elastic means, such as an elastic silicone rubber compression pad, is thereafter inserted prior to applying the end closure cap.

The thickness of the silicone rubber pad and its resistance to compression are selected so that a greater axial force is required to compress the pad than to stretch the silicone rubber light pipe. This is important to avoid fracturing the sodium iodide crystal by excessive tensile forces.

An object of the present invention is to provide a simple, economical, scintillation detector which has a high efficiency and an exceptionally long useful life even when repeatedly subjected to shock loads approaching or exceeding 100 g's.

These and other objects, uses and advantages of the invention will become apparent to those skilled in the art from the drawings, description and claims.

DESCRIPTION OF THE PREFERRED EMBODIMENTS

Figure 1:
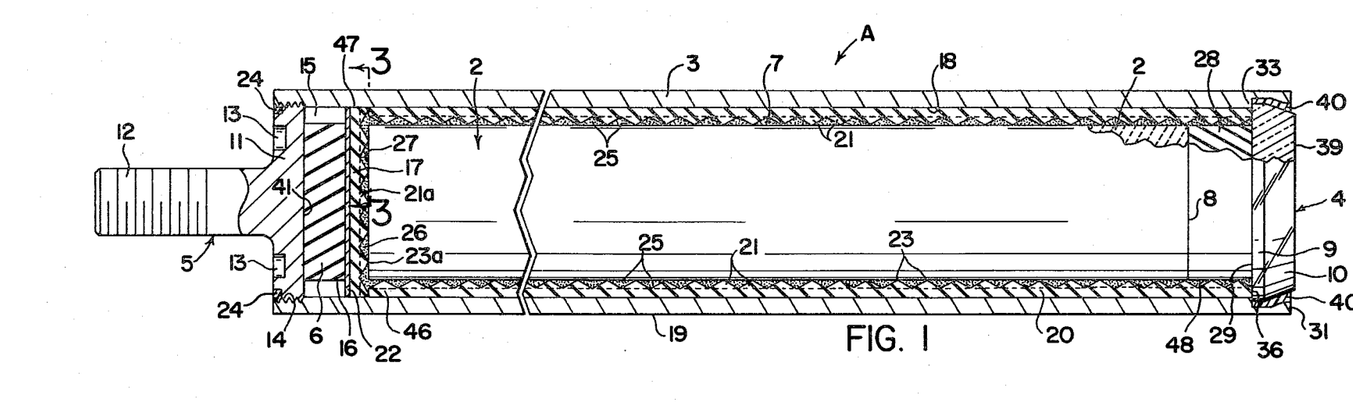
FIG. 1 is a foreshortened longitudinal sectional view showing a scintillation detector unit constructed according to the present invention.
Figure 2:
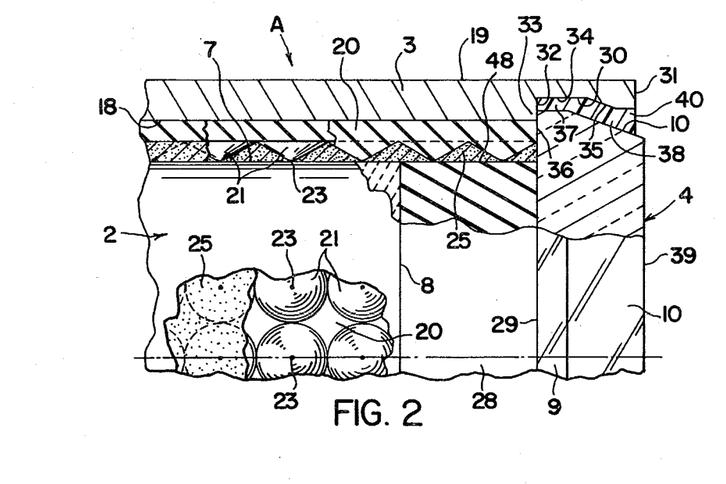
FIG. 2 is an enlarged fragmentary longitudinal cross-sectional view showing a portion of the scintillation detector on a larger scale.
Figure 3:
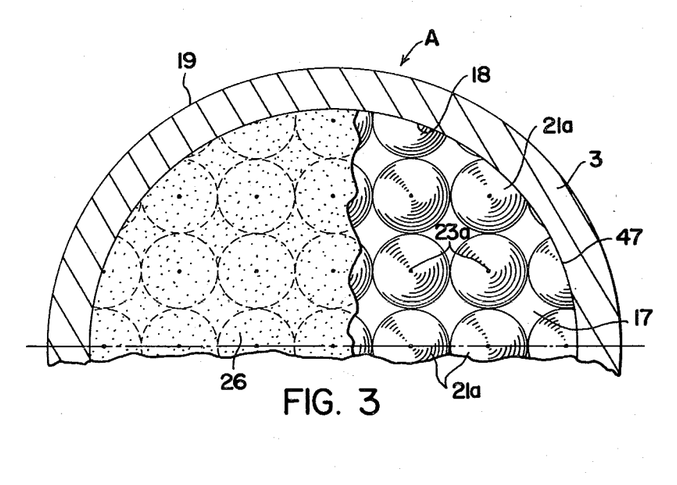
FIG. 3 is a fragmentary transverse cross-sectional view with parts broken away taken on the line 3—3 of FIG. 1 and on the same scale as FIG. 2.

Referring more particularly to the drawings, in which like parts are identified by the same numerals throughout the several views, FIGS. 1 to 3 show a scintillation detector A comprising a large one-piece metal-activated alkali metal halide scintillation crystal 2 located in a rigid metal tube or cylinder 3 having a round glass optical window 4 at one end and a metal end closure cap 5 at the opposite end. Expansion means in the form of an elastic rubber compression pad 6 is provided between the end cap and the scintillation crystal to bias the crystal axially toward the window 4.

The crystal 2 is preferably a high-purity thallium-activated sodium iodide and may be cut or machined to provide a smooth cylindrical external surface 7 and flat end faces 8 and 27 perpendicular to the axis.

The detector A may be designed for measurement of cosmic radiation in a space vehicle or high-altitude aircraft or may be used for oil well logging as disclosed in application Ser. No. 579,402, filed May 21, 1975, now U.S. Pat. No. 4,004,151. Many parts of the scintillation detector shown herein are similar to or correspond to those of the detector described in that patent, but it will be understood that many of the special features of the latter detector may be of lessor importance when the detector is used in a different environment, as in a space vehicle.

The cylinder 3, the cap 5 and other metal parts may be made of steel or other high strength metal alloy and preferably a stainless steel, such as type 304 stainless steel. The window 4 may be made of quartz glass or a high-silica glass or may be the same as the window of said U.S. Pat. No. 4,004,151. The glass of the window should have a high light transmittance at wavelengths in the vicinity of 4000 Angstroms and preferably has a light transmission of at least 90 percent at a wavelength of 4200 Angstroms. The window is preferably circular and may have a narrow cylindrical surface 9 and a wider frusto-conical surface 10, but other shapes can be used.

The end cap 5 has a circular closure portion 11 with a flat surface 41 and has an elongated projecting portion 12 of smaller diameter which is perpendicular to surface 41 and is externally threaded to provide means for connecting the scintillation detector A to a larger unit. A plurality of tool-receiving recesses 13 may be provided in the cap 5 to facilitate rotation.

As shown the end of the cylinder 3 is machined to provide a threaded counterbore 14 to receive the externally threaded closure portion 11 and a sealing annulus 24 of epoxy resin, solder or other suitable sealing material. The annulus 24 bonds the cylinder 3 to the cap throughout its circumference to provide a permanent hermetic seal.

The scintillation crystal 2 is relatively large and axially elongated and preferably has a length several times its diameter. The external diameter of the crystal at 7 is less than the diameter of the internal surface 18 of the cylinder 3 to provide an annular space of narrow cross section. In a conventional scintillation detector, this annular space contains a layer of aluminum oxide powder or other reflective material surrounding the crystal and usually a pair of elastic rubber O-rings which center the crystal in the cylinder and prevent loss of the aluminum oxide powder.

In the scintillation detector A of this invention, this annular space is of somewhat greater radial width and of a size to receive a special sleeve 20 of synthetic elastomeric material which is preferably molded to provide a multiplicity of protrusions or protuberances 21 closely arranged in the side-by-side relation throughout the length and circumference of the sleeve. The space between the sleeve and the crystal is filled by a layer 25 of aluminum oxide powder. The protrusions 21 are preferably of the same shape and the same height and are preferably arranged in alignment in parallel rows so that each protrusion is adjacent to several other protrusions. The arrangement and spacing of the protrusions is preferably uniform, but many different arrangements may be used. Each protrusion 21 is tapered and gradually decreases in height in a direction away from its outer central surface and is preferably shaped so that its resistance to deformation gradually increases as it is compressed.

The protrusions 21 may be hemispherical or frusto-conical and are preferably obtuse and generally conical or generally pyramidal, but the shapes may vary. They are preferably tapered and shaped to provide minimum contact with the crystal and optimum protection against damage to the crystal while at the same time permitting packing and use of an adequate amount of reflective material around the crystal.

The preferred reflective material for such use is aluminum oxide powder. Other reflective materials can be used, such as magnesium oxide powder or titanium dioxide powder.

The sleeve 20 is made of an elastic heat-resistant synthetic rubber, preferably a silicone rubber as described in more detail hereinafter.

The flat end face 27 of the scintillation crystal 2 is parallel to and spaced from the flat face 41, and a flat elastic rubber compression pad 6 is located between said faces. In the unit shown herein, a flat circular metal disc 22, with a diameter substantially corresponding to that of the internal surface 18, is located on the flat face of the pad 6 parallel to face 41, and a flat circular disc 17 of elastic rubber is compressed between the metal disc and the flat face 27 of the crystal. As shown, a layer of reflective material, such as aluminum powder, is provided at face 27.

The disc 17 is preferably made of a heat-resistant synthetic rubber, such as a silicone rubber, and may be made of the same material as the sleeve 20. It is preferably provided with a multiplicity of tapered protrusions, such as generally conical or generally pyramidal protrusions 21a identical to or similar to those of the sleeve 20.

The flat end face 8 of the scintillation crystal 2 is parallel to and spaced from the flat face 29 of the optical window 4 to provide space for a transparent optical coupling material. In conventional scintillation detectors, various optical coupling materials can be used. As indicated for example, in U.S. Pat. No. 3,426,195 these include epoxy resins, silicone oils, silicone rubbers, silicone greases and the like.

In the scintillation detector A of the present invention the space between the crystal 2 and the optical window 4 is relatively wide and receives an extensible transparent light pipe 28 which serves as a flexible protective coupling between the crystal and the window. The coupling member 28 is formed of an elastic silicone rubber which has high light transmittance at wavelengths in the range of 3000 to 5000 Angstroms. The flexible coupling member 28 and the elastic compression pad 6 maintain pressure on the opposite ends of the crystal 2 to resist axial movement of the crystal relative to the cylinder.

Hermetic seals of many different types can be employed for the glass window of a scintillation detector. If the detector is used for oil well logging, a very effective seal should be provided. For example, a special mounting and a special type of epoxy resin composition may be employed, as disclosed in more detail in said U.S. Pat. No. 4,004,151, the entire disclosure of which is incorporated herein by reference.

As herein shown, the cylinder 3 has a tapered annular recess 30 extending form the flat face 31 of the cylinder 3 to the flat annular face 32 of the annular shoulder 33. The recess has a cylindrical surface 34 and a frustoconical surface 35. An annular layer 40 of a special epoxy resin composition is packed into the annular space between the recess 30 and the periphery of the window and is cured to provide a continuous solid impervious layer. The epoxy layer has a cylindrical portion 37 and a thicker tapered portion 38 which terminates at the end face 31.

The optical glass window 4 is of a size to close the end of the cylinder 2 and may have a thickness of from about 0.2 to 0.6 inch and an external diameter up to 1.5 inches or somewhat greater. The taper at surface 10 is usually in the range of 15 to 30 degrees. The annular recess 30 is of such size and shape that the cured epoxy resin at 40 is placed under compression and provides a reliable permanent hermetic seal. The major portion of the annulus 40 may, for example, have a thickness of from about 0.05 to about 0.1 inch. The substantial thickness combined with tha tapered arrangement enables the annulus 40 to function effectively and to maintain a permanent bond to the glass window and to the metal cylinder.

As indicated in said U.S. Pat. No. 4,004,151, there are various epoxy resins available commercially which can be employed. Satisfactory results can, for example, be obtained using a high-temperature epoxy adhesive paste, such as Epoxylite #810, which can be cured at room temperature. Other epoxy resin compositions can also be used which cure at elevated temperatures.

A particularly important feature of this invention is the provisions of the extensible or deformable transparent silicone rubber light pipe 28 of substantial axial thickness permanently coupling the optical window 4 to the sodium iodide crystal 2 while permitting movement of the crystal a substantial distance toward or away from the window under high g forces. The silicone rubber should have good light transmission in the crystal emission range (e.g., a transmission of at least 80 percent at wave lengths between 3000 and 5000 Angstroms) and also must be soft and deformable. Various silicone rubbers can be employed with light transmittances of 80 to 90 percent at a wavelength of 4200 Angstroms. The Shore A durometer hardness (ASTM D2240-64T) should be in the range of from about 30 to about 40. The rubber should have an elongation (ASTM D412) of at least 100 and preferably at least 200 percent and a tensile strength (ASTM D412) of at least 200 and preferably at least 400 pounds per square inch.

Various silicone rubbers can be employed for the light pipe 28. Good results are obtained, for example, using well known, high strength, room-temperature-curing silicone elastomers, such as "Sylgard 184" or "Sylgard 186" made by Dow Corning Corporation, which have good light transmission.

Various other heat resistant rubbers can be used in the cushioning sleeve 20, the cushioning disc 17 and the compression pad 6. However, it is preferable to employ a high quality silicone rubber.

The pad 6 can be formed of a durable high strength elastic rubber with a Shore A hardness of 30 to 70 and is preferably formed of a silicone rubber, such as a "Sylgard" resin, having an elongation of several hundred percent and a tensile strength in excess of 500 pounds per square inch.

The sleeve 20 and the disc 17 can be made of the same material and are preferably formed of a durable heat resistant rubber with a Shore A hardness not in excess of 45. They are preferably formed of a durable high quality elastic silicone rubber with a Shore A durometer hardness (ASTM D 2240-64T) in the range of from about 28 to about 40. The rubber preferably has an elongation of at least 100 percent and a tensile strength of 200 to 500 psi or higher. Excellent results can be obtained where the sleeve 20 and the disc 17 are formed of "Sylgard" silicone elastomers, such as Sylgard 184 or Sylgard 186. These are supplied as convenient two component pourable systems and can readily be molded and cured at room temperature. Other commercial silicone rubbers are also suitable.

The rubber selected for the cushioning sleeve 20 and the cushioning disc is preferably one which can be loaded with substantial amounts of a reflective powder, such as aluminum oxide ($Al_2O_3$), to provide a reflective elastomeric material. Because the peaks of the protrusions 21 and 21a engage the surface of the crystal 2, it is preferable to form such protrusions of an elastic rubber which serves as a reflecting means. For this reason, they are formed of a silicone rubber containing 15 to 25 percent and preferably around 20 percent by weight of aluminum oxide. For example, a sleeve 20 molded from a Sylgard elastomer, such as Sylgard 186 or Sylgard 184, containing 20 percent by weight of aluminum oxide ($Al_2O_3$) and shaped as illustrated in the drawing enables the detector A shown herein to function at high efficiency. The elastomer should not contain fillers or additives which seriously reduce the reflective properties or impart a dark color to the rubber. The elastomer is preferably one which would be clear or white without the aluminum oxide powder.

While the tapered protrusions 21 and 21a of the molded silicone rubber members 20 and 17, respectively may have various shapes, they are preferably obtuse and preferably have a width at the base which is at least twice the height of the protrusions. Such height is preferably from about ⅛ to about ⅔ the maximum thickness of the rubber member from the tips of the protrusions at the inner surface to the flat outer surface. For example, in the drawings each of the protrusions 21 and 21a may have a width or diameter of 3/6 inch at the base and a height of 1/16 inch, and the maximum thickness of the rubber member corresponding to the radial distance from crystal surface 7 to the cylindrical surface 18 may be ⅛ inch. Such maximum thickness also corresponds to the distance from the flat surface of the crystal to the flat plate 22. It will be understood, of course, that other thicknesses of material may be employed and also that the silicone rubber may have a somewhat lower density if a blowing agent is employed to provide a cellular structure.

While obtuse conical protrusions are shown in the drawings for purposes of illustration, it will be apparent that each protrusion or protuberance can be in the form of a pyramid with a square base having, for example, a width of 3/16 inch and that the center of each protrusion can be spaced 3/16 inch from the center of the adjacent protrusion. It will also be understood that other projecting portion shapes can be employed. It is usually preferable, however, to limit the area of contact of the projecting portions with the crystal 2 so that the reflective means surrounding the crystal is more effective. As shown in FIG. 2, the projecting portions 21 should preferably contact only a small portion (e.g., less than 10 percent) of the total peripheral area of the crystal and the reflective material 25 should preferably contact the major portion (e.g., at least 80 or 90 percent) of such area.

A ribbed or corrugated shape may be used with the ribs or corrugations preferably running in the direction of the longitudinal axis to provide passageways so that reflective powder can be packed around the corrugations. The longitudinal corrugations may be continuous or discontinuous in aligned or random unaligned lengths. Ribs or corrugations can also be used in combination with the tapered protrusions 21 to restrict movement of the reflective powder.

The scintillation detector A has been drawn substantially to scale to FIGS. 1, 2 and 3 to illustrate an embodiment of the invention, but it will be understood that the size and proportions may vary considerably. For example, the compression pad 6 may have various thicknesses and may be made of rubbers of different durometer hardness depending on variables such as the shape of the pad, the number of cells or cavities provided therein, and the thickness of the light pipe 28. Likewise, the thickness of the protective sleeve 20 and the protective disc 17 may vary.

The present invention is particularly advantageous for detectors having relatively large scintillator crystals with a weight in the range of from 2.5 to 3.5 pounds and, for example, a length of 10 to 20 inches and a diameter of 1.2 to 1.8 inches. In accordance with the invention, a typical detector having a sodium iodide crystal 2 with a length of 10 to 14 inches, a width or diameter of 1.3 to 1.6 inches and a weight of 2.5 to 3 pounds could be provided with an optical window 4 with an axial thickness of from about 0.25 to about 0.6 inch (preferably 0.4 to 0.5 inch), a silicone rubber light pipe 28 with an axial thickness of from about 0.4 to about 0.8 inch, a stainless steel tube or cylinder 3 of round, square or polygonal cross section with an internal width or diameter at surface 18 from about 0.2 to about 0.3 inch greater than the external width or diameter of the crystal at surface 7, and a silicone rubber sleeve with a thickness of from about 0.1 to about 0.15 inch at the tips of the protrusions. Such detector could have a silicone rubber compression pad 6 with a diameter of 1 to 1.5 inch and an axial thickness of from about 0.2 to 0.5 inch, which is 0.1 to 0.3 inch less than the axial thickness of the light pipe 28.

If the rubber of the pad 6 has a Shore A durometer hardness in the range of 30 to 40, the pad preferably has substantially less thickness than the light pipe 28 to protect the crystal against excessive tensile stress, but the pad can have a greater thickness if its durometer hardness is 40 to 60 or more.

If the pad 6 is cylindrical and molded as a solid non-cellular block, its diameter can be 0.1 to 0.4 inch less than the internal diameter of the cylinder 3 to provide ample radial clearance at 15 for deformation. A smaller radial clearance can be employed where the pad has a different shape or is specially designed to engage the surface 18 under high g loads.

It is contemplated that the crystals encapsulated in accordance with this invention can have a diameter of from about 1 to 3 inches and a length of from 6 up to 20 inches or more. While most crystals will be round in cross section, it is also contemplated that this invention may be used with crystals which are square in cross section or have other cross-sectional shapes.

While the pad 6 is preferably spaced from the crystal 2 and separate from the disc 17, it will be apparent that the pad and disc can be integrally joined or molded as a single block of silicone rubber (e.g., Sylgard 186), so that the tapered protrusions 21a are formed by molding of the pad 6. The sleeve 20 can also be molded integral with the pad. It will also be apparent that the silicone rubber of the pad 6 can be a foam rubber or include a high percentage of aluminum oxide as in the sleeve 20 and the disc 17. While a foaming agent can also be employed in the silicone rubber of the disc 17 or the sleeve 20, it is preferable to provide either a non-cellular rubber or a rubber with a porosity less than 10 percent.

A scintillation detector as described above differs from a conventional scintillation detector in many respects. Heretofore, a typical detector with a sodium iodide crystal having a diameter of 1 inch or so and a length of 8 to 10 inches would, for example, have a space between the crystal and the optical window with an axial width of 0.02 to 0.1 inch to receive the optical coupling material and would, for example, have a metal cylinder only slightly larger than the crystal to provide an annular space for the aluminum oxide powder having a radial width of less than 0.1 inch and usually 0.03 to 0.07 inch. Also the typical unit would be preloaded by placing a metal spring under substantial compression when the end of the cylinder was closed. As a result, the conventional scintillation detector had poor resistance to shock and vibration.

The scintillation detector A of the present invention may be assembled to preload the pad 6 somewhat so that it is normally under slight compression, but the pressure maintained on the glass window is usually less than 30 pounds per square inch and is preferably 1 to 20 pounds per square inch or less to protect the window against breakage at high axial g loads. This makes it possible to provide the light pipe 28 with the proper thickness and to allow it to absorb 30 to 45 or more of the axial g forces by stretching in a direction away from the window. The thickness of the light pipe is preferably no more than half its diameter. For example, the diameter of the light pipe is usually about 2 to about 4 times its axial thickness.

The scintillation detector A of this invention can be manufactured in various ways. For example, the light pipe 28 may be molded and cured and thereafter bonded to the sodium iodide crystal and to the optical window, or the light pipe can be cast and allowed to cure while in contact with the crystal and the glass window. The latter procedure is sometimes preferred because it can provide a strong bond to the crystal and to the glass. An example of the latter process is given below to illustrate the invention, but it will be understood that other procedures could be employed.

All of the surfaces of the sodium iodide crystal are cleaned in a suitable dry chamber to remove the hydrate from the surface. The flat end surface 8 of the end crystal is polished in the conventional manner, for example using an alcohol or acetone solvent polish. The polished surface 8 can be provided with a thin surface coating by brushing, dipping or spraying with a suitable coating material, such as "Eccocoat AC-8", a clear acrylic-based coating material made by Emerson & Cuming, Inc. of Canton, Massachusetts. The material may be diluted with toluene to provide an easily paintable consistency. Such coating is allowed to dry for approximately one hour and is thereafter covered with a thin layer of conventional primer, such as "Sylgard primer" or "A-4094 primer" made by Dow Corning Corporation. The primer is applied as a thin layer by dipping, brushing or spraying and is allowed to cure in a dry chamber or a low humidity area for 12 hours. The flat surface 29 of the glass window is similarly coated with such primer and also allowed to dry in the same manner for 12 hours.

A special cylindrical mold may be provided to cast the light pipe 28, but it is more convenient to form a casting cavity at the end of the crystal tube by wrapping a strip of polyethlene or other suitable plastic around the end portion of the crystal so that it extends beyond the end of the surface 8 a distance corresponding to the desired thickness of the light pipe 28. A curable silicone rubber composition such as Dow Corning Sylgard 186 can be mixed and poured into the aforesaid cavity to fill the cavity, and to form a convex surface at the top of the cavity, and the surface 29 of the glass window 4 may then be placed over the cavity in contact with the convex surface so that it rests on the end portions of the plastic cylinder and engages the silicone rubber mix substantially throughout the entire upper area of the cavity.

Placing the window on the convex surface of the rubber insures uniform contact with the glass surface, avoids air bubbles, and causes the excess rubber to flow outwardly between the glass and the outer edge of the plastic cylinder. It is preferable to provide a series of narrow openings with a small width of 0.03 inch or less to permit escape of this excess rubber, and this can easily be accomplished by cutting the plastic cylinder so that it has three ears spaced 120 degrees apart, each ear having a small height, such as 0.03 inch, and extending a few degrees around the circumference for engagement with the glass. The rubber mixture has a viscosity such that it does not flow through the openings provided by the aforesaid ears until pressure is applied to the rubber by the glass window.

After the glass has been placed on the plastic cylinder and adhered to the silicone rubber in a position coaxial with the crystal 2, it is allowed to set in place in a horizontal position for about 48 hours to allow the silicone rubber to curre. At the end of this time the plastic strip surrounding the light pipe 28 and the end portion of the crystal 2 can be unwrapped. The resulting assembly comprising the crystal 2 and the optical window 4 bonded to the opposite faces of the light pipe 28 is then ready for assembly in the detector A.

The rubber sleeve 20 and the disc 17 may be formed of various silicone rubbers and may, for example, be formed of GE 615, Sylgard 184 or Sylgard 186 silicone rubber using generally the same mixing procedure as that employed for the light pipe but incorporating substantial amounts of aluminum oxide powder in the rubber. The rubber should be mixed and then placed into a suitable mold cavity having mold surfaces shaped to form the protuberances 21 and 21a. The rubber is preferably molded as a flat sheet which is cured and thereafter cut to form the disc 17 and the sleeve 20.

The sheet forming the sleeve 20 is placed inside the stainless-steel cylinder 3 before the crystal and light pipe assembly is placed inside the cylinder. After the assembly is positioned as in FIG. 1 with the window 4 engaging the shoulder 3 of the cylinder, the hermetic seal 40 may be formed around the window as described in said U.S. Pat. No. 4,004,151.

Aluminum oxide powder is then introduced from the open end of the cylinder and caused to move axially toward the window 4 by vibrating the detector while it is supported in a vertical position. This causes the powder to move down past the protuberances and fill the spaces between the protuberances. After the space between the crystal 2 and the sleeve 20 has been filled, the silicone rubber disc 17 may be inserted. Before it is placed in position against the cylinder, it is packed with a layer of aluminum powder to fill the spaces between the protuberances 21a so that, when it is mounted in place as shown in FIG. 1, the aluminum powder substantially fills the space between the disc 17 and the end face 27 of the crystal. The circular metal plate 22 is then inserted behind the metal disc 17, and the silicone rubber compression pad 6 is placed against the plate 22. Thereafter the end cup 5 is screwed into the threaded counterbore 14 of the cylinder to bring the flat face 41 thereof into engagement of the flat face of the pad 6. At this time the parts are as shown in FIGS. 1 and 2, and a slight pressure is applied to maintain the crystal 2 in position and to place a slight force on the window 4. The unit can then be provided with a suitable hermetic seal by soldering the end cap in place or by employing an epoxy sealing compound at the annulus 24 or at the ends of the threads at 14.

If it is desired to omit the threads, the end of the detector A may be closed using a split ring arrangement as shown, for example, in said U.S. Pat. No. 4,004,151.

The rubber parts used in the detector A are preferably formed of a silicone rubber, particularly because of its heat resistance and light transmitting properties. A number of different silicone rubbers can be used, but those with curing mechanism by-products that may adversely affect the crystal should be avoided. The silicone rubber usually has a polydimethylsiloxane chain or the like, may have a small percentage of unsaturated groups, and may have a molecular weight from 10,000 to 500,000.

Good results can be obtained, for example, using various vinyldiorganosiloxy endblocked polydimethylsiloxanes of the general formula $R_2(CH_2=CH)SiO(R_2SiO)_nSiR_2(CH=CH_2)$, in which R and R' are both selected from the group consisting of methyl and phenyl radicals. At least 90 mol percent of the R' groups are preferably methyl groups, and the viscosity is preferably from about 1000 to about 150,000 centipoises at 25° C. Siloxanes of this type are disclosed, for example, in U.S. Pat. No. 3,284,406 and may be cured to the elastomeric state using any of the well known platinum and platinum compound catalysts which are effective for catalyzing the reaction between the silicon-bonded hydrogen groups and the silicon-bonded vinyl groups. Suitable platinum-type catalysts are disclosed in U.S. Pat. No. 2,823,218 and U.S. Pat. No. 3,527,655.

Various crosslinkable high molecular weight diorganosiloxanes containing vinyl siloxy units, such as the polysiloxanes of the above general formula, are known which may be cured to provide high strength silicone elastomers suitable for use in the scintillation detectors of this invention. Curing is preferably effected in a conventional manner at room temperature or about 25° C. using platinum-type catalysts to provide soft rubbers with a Shore A durometer of from 25 to 45. The amount of catalyst is usually not critical. Curing may also be effected at moderate temperatures from 50° C. to 100° C. using platinum catalysts or other curing systems.

While many rubber forming polysiloxanes, such as those of the above general formula, are not suitable for making the light pipe 28, there are various silicone rubbers such as GE 615, Sylgard 184 and Sylgard 186, which have satisfactory optical properties and good light transmission in the crystal emission range (e.g., 3000 to 5000 Angstroms).

Many of the silicone rubbers with marginal or unsatisfactory light transmission characteristics can be employed to form the molded reflective elements 17 and 20, but some of the silicone rubbers are unsatisfactory for this purpose because they have a dark color or poor reflective properties. For example, Sylgard 187 resin can be used to form the compression pad 6 but is black and opaque and should not be used for making the reflective elements 17 or 20.

The silicone rubber selected for the latter reflective elements is one which can be heavily loaded with a reflective material, such as aluminum powder, magnesium oxide powder or titanium dioxide powder, to produce a silicone elastomer which is white or does not absorb light, and the preferred silicone rubber is one which is normally clear to translucent after curing or which has good optical properties, such as Sylgard 184 or Sylgard 186.

The rubber composition used to form the molded rubber sheets for the elements 17 and 20 preferably contains from 70 to 80 percent by weight of a high molecular weight polysiloxane, such as a "Sylgard" resin or a resin of the above general formula, and from about 18 to about 25 percent (more preferably 20 percent) by weight of finely divided aluminum oxide ($Al_2O_3$). Such composition can contain small amounts of other fillers or additives in addition to the catalyst or curing agent, but the additives should not be of a type to interfere with the desired reflective properties of the rubber and, if used, are preferably present in small amounts not in excess of 5 percent by weight.

In the practice of this invention it is convenient to employ room temperature curing silicone elastomers supplied as two component pourable systems, such as "Sylgard" resins made by Dow Corning Corporation. The curing agent is a low viscosity liquid, and 1 part of curing agent may be used with about 10 parts of the silicone resin. When making the light pipe 28, the polymer is preferably Sylgard 184 or Sylgard 186 and steps should be taken to eliminate entrapped air so that the molded pipe is void free. Mixing can be carried out in such a way that air entrapment is minimized, and the mixture can be exposed to a vacuum for 30 minutes or more to remove the entrapped air. Care should also be taken to avoid formation of bubbles when the mix is poured into the mold. Where the light pipe is molded and cured prior to assembly with the optical window and the crystal, a vacuum can be applied to the mold.

A clear precast silicone rubber light pipe can be bonded to the glass window and to the sodium iodide crystal with silicone rubber adhesives. When bonding silicone rubbers to a flat substrate it is usually necessary to prime the surface of the substrate. Priming may be effected in different ways and is commonly effected by applying a thin surface coating of a primer such as Sylgard primer, Dow Corning 92023 primer or Dow Corning A-4094 primer. The latter primer is a dilute solution of moisture-reactive materials in a naphtha solvent and is applied to the substrate after it has been thoroughly cleaned and degreased. It can be used as a primer for both the crystal 2 and the glass window 4. Care should be taken that the primer materials do not contain solvents which might adversely affect the crystal.

If desired the flat polished surface 8 of the crystal can be provided with a thin clear surface coating to act as a barrier layer before the primer is applied. The coating material selected should be one which adheres well to the crystal and protects it against primer solvents. Suitable barrier layers may be formed from Eccocoat AC-8 or other conventional acrylic-based coating materials.

Best results are obtained when the silicone rubber used to form the light pipe is one which can be cured without producing by-products which could adversely affect the bond to the crystal or to the glass. Sylgard resins, such as Sylgard 186, are excellent because they produce no by-products.

While it is well known that scintillation crystals are preferably formed of thallium-activated sodium iodide, advantages of the invention can be obtained using crystals formed of iodides of potassium, rubidium, cesium or lithium or other alkali metal halides, such as lithium fluoride or the like. As indicated in U.S. Pat. No. 3,898,460, the alkali metal iodides are preferred for scintillation crystals, and the metal activator is preferably tin or thallium, but other metals can also be used.

Figure 4:
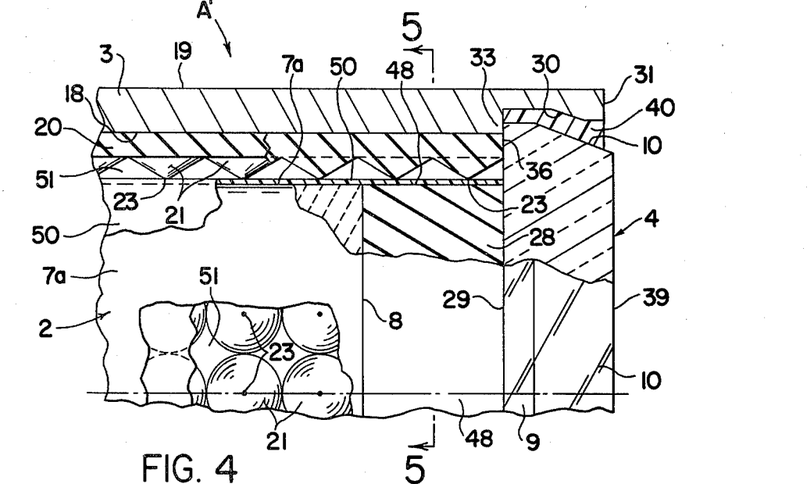
FIG. 4 is a longitudinal cross-sectional view similar to FIG. 2 showing a modification of the detector.
Figure 5:
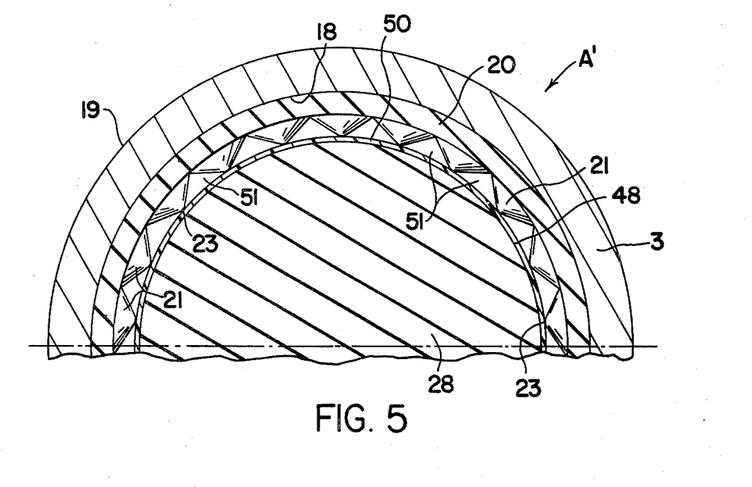
FIG. 5 a fragmentary transverse cross-sectional view of the modified detector of FIG. 4.

Advantages of the present invention may be obtained when the reflecting means surrounding the crystal 2 of the scintillation detector unit A is replaced with other suitable reflecting means. For example, the aluminum powder 25 may be omitted or replaced with a different reflective layer. FIGS. 4 and 5 show a modified form of scintillation detector unit A' wherein the aluminum powder 25 is omitted and the cylindrical surface of the crystal 2 is highly polished.

The elements of the unit A' are the same as those of the unit A and include a large one-piece metal-activated alkali metal halide crystal 2, a metal cylinder 3, an optical window 4, an end cap 5, a compression pad 6, a rubber disc 17, a silicone rubber sleeve 20 with a multiplicity of protuberances 21, a silicone rubber light pipe 28, and an annular epoxy layer 40 in the annular space between the recess 30 and the periphery of the window. The elements 5, 6 and 17 are shown in FIG. 1.

The crystal 2 of the unit A' has a highly polished external cylindrical surface 7a and a surrounding thin cover layer or cover sheet 50, which may be formed of a suitable white paper or plastic and is preferably formed of a white Teflon. Part or all of external surface 7 of the crystal of the unit A' may also be polished, if desired.

The highly polished surface 7a provides the reflecting means needed for effective operation of the unit and is not affected by severe vibrations or shock forces. The cover sheet 50 protects the polished surface and also reinforces the crystal. A solvent polished surface is preferred, but polishing may be effected in various ways. For example, the entire outer surface 7a of the crystal 2 may be machined and also polished with emery cloth or steel wool on a lathe or other machine and then further polished in a conventional manner using a solvent, such as acetone or an alcohol.

In the embodiment of the invention shown in FIGS. 4 and 5, the special elastic rubber sleeve 20 is provided in the annular space between the outer cylinder 3 and the cover sheet 50 and the air space 51 between said sleeve and said sheet is empty. The sleeve 20 shown herein is of such shape that the peaks of the protrusions 21 engage the sheet 50 of the unit A' (or the surface 7 of the unit A) throughout less than 5 percent of its total area. This general shape is preferred because it provides optimum cushioning of shocks and optimum protection of the crystal 2, but it will be understood that advantages of the invention can also be obtained when the elastic sleeve 20 is replaced with an elastic foam rubber sleeve having a similar shape or having an annular shape and a uniform radial thickness. The elastic foam rubber sleeve should be of such size and construction as to provide the needed cushioning against radial shock forces and preferably has the same length as the sleeve 20 so as to extend from the window 4 to the disc 27. Such sleeve may be made of various elatomeric materials.

The term "transparent" is used herein in the broad sense and refers to material which is transparent to ultraviolet light and, when a sodium iodide crystal is employed, to light with a wave length which peaks at 4200 Angstroms.

It will be understood that in accordance with the provisions of the patent statutes, variations and modifications of the specific methods and devices disclosed herein may be made without departing from the spirit of the invention.

Having described my invention I claim:

1. A shock-resistant scintillation detector comprising an elongated container containing a large elongated scintillation crystal of an alkali metal halide, said crystal being coaxial with said container and extending along the length of the container, cushioning means disposed between the internal surface of said container and the peripheral surface of said crystal for supporting the crystal and cushioning transverse movements thereof, a transparent window closing one end of said container and spaced from one end of said crystal, a closure member at the opposite end of said container spaced from the other end of said crystal, a yieldable elastic member located between said closure member and said last-named other end, and a flexible elastomeric optical coupling member located between and bonded to said crystal and said window, said coupling member having a diameter no more than about four times its axial thickness and having a high light transmittance at a wavelength of 3000 to 5000 Angstroms, said elastic member having substantially more resistance to compression than said optical coupling member so that more force is required to compress said elastic member a given distance than to stretch said coupling member the same distance, whereby the crystal is protected against tensile force fracture.

2. A shock-resistant scintillation detector according to claim 1 wherein said optical coupling member is an elastic silicone rubber having Shore A durometer hardness of from about 30 to about 40.

3. A shock-resistant scintillation detector according to claim 1 wherein said elastic member is formed of a silicone rubber and has a thickness substantially less than that of said optical coupling member.

4. A scintillation detector according to claim 3 wherein said optical coupling member has an axial thickness of from about 0.4 to about 0.8 inch and said elastic member has an axial thickness at least 20 percent less than that of said coupling member.

5. A scintillation detector according to claim 1 wherein said elastic member absorbs a major portion of the g forces applied to the crystal in a direction away from said window by compression and said optical coupling member has a diameter of from about 2 to about 4 times its axial thickness and is stretched to absorb from about 30 to about 45 percent of said g forces in that direction if the crystal is subjected to an axial shock force of 100 g's.

6. A scintillation detector according to claim 1 wherein said closure member is a rubber compression pad compressed between said closure member and said crystal so that the force of said optical coupling member against said window is less than 30 pounds per square inch when the crystal is in its normal position.

7. A scintillation detector according to claim 6 wherein the force of said optical member against said window is no more than 20 pounds per square inch when the crystal is in its normal position.

8. A scintillation detector according to claim 1 wherein said optical coupling member is formed of a clear elastic silicone rubber having a Shore A durometer hardness up to about 40 and a light transmission of at least 80 percent at wavelengths in the crystal emission range.

9. A scintillation detector according to claim 1 wherein said cushioning means comprises a flexible elastomeric sleeve surrounding said crystal and wherein reflecting means are provided at the periphery of said crystal.

10. A scintillation detector according to claim 9 wherein said sleeve is formed of an elastic rubber having a Shore A durometer hardness of from about 25 to about 40.

11. A scintillation detector according to claim 9 wherein said sleeve is formed of a sheet of elastic foam rubber.

12. A scintillation detector according to claim 9 wherein said reflecting means includes a highly polished surface at the periphery of said crystal.

13. A scintillation detector according to claim 9 wherein a finely divided reflective material is provided between said elastomeric sleeve and the periphery of said crystal.

14. A scintillation detector according to claim 1 wherein a flexible elastomeric sleeve surrounds said crystal, said sleeve having closely arranged integral projecting portions disposed around the peripheral surface of the crystal and along the length thereof to locate it substantially coaxial with said cylinder, and wherein reflective material is provided between said sleeve and the peripheral surface of said crystal.

15. A scintillation detector according to claim 14 wherein said integral projecting portions of the sleeve contact a small portion of the total area of the peripheral surface of said crystal and said reflective material covers the major portion of said peripheral surface.

16. A scintillation detector according to claim 14 wherein said projecting portions of said sleeve comprise a multiplicity of tapered obtuse protrusions.

17. A shock-resistant scintillation detector comprising an elongated metal cylinder containing an elongated sodium iodide scintillation crystal coaxial with said cylinder, a glass window substantially within and closing one end of said cylinder, an optical coupling member between said window and the end of said crystal, a closure member at the opposite end of said cylinder and spaced from the end of said crystal, yieldable means betwen said end and said crystal for biasing said crystal toward said window, and reflecting means surrounding said crystal which comprises a reflective sheet of soft white elastomeric material having projecting portions which contact the peripheral surface of said crystal for cushioning radial movements of said crystal and finely divided reflective material disposed around said crystal in the spaces between said projecting portions, said sheet being formed from a silicone rubber composition containing from about 18 to about 25 percent by weight of aluminum oxide.

18. A shock-resistant scintillation detector according to claim 17 wherein a portion of said reflective sheet engages and covers the end of said sodium iodide crystal.

19. A hermetically-sealed shock-resistant scintillation detector comprising an elongated cylinder containing an elongated scintillation crystal of an alkali metal halide, said crystal being coaxial with said cylinder and extending along the length of the cylinder, a window closing one end of said cylinder, a deformable optical coupling member between said window and the end of said crystal, a closure member at the opposite end of said cylinder and spaced from the end of said crystal, yieldable means between said closure member and said crystal for biasing said crystal toward said window, an axially elongated reflecting cushioning sleeve of soft elastomeric material surrounding and covering the peripheral surface of said crystal and engaging the internal surface of said cylinder for cushioning radial movements of said crystal, said sleeve being formed of a silicone rubber containing at least 15 percent by weight of a reflective metal oxide, and reflecting means within said sleeve at the peripheral surface of said crystal.

20. A scintillation detector according to claim 19 wherein a finely divided reflective material is provided between said elastomeric sleeve and the periphery of said crystal.

21. A scintillation detector according to claim 19 wherein said reflecting means comprises a highly polished axially elongated cylindrical surface at the periphery of said crystal.

22. A scintillation detector according to claim 19 wherein said reflective sleeve comprises a sheet of soft white elastomeric material having a multiplicity of inwardly projecting portions which engage a small portion of the peripheral surface of said crystal, and wherein a finely divided reflective material is provided in the spaces between said inwardly projecting portions for covering the major portion of said peripheral surface.

23. A scintillation detector according to claim 19 wherein said elastomeric sleeve is provided throughout its length and circumference with a multiplicity of closely arranged integral tapered obtuse protrusions engageable with the periphery of said crystal to cushion movements of said crystal.

24. A scintillation detector according to claim 23 wherein each of said protrusions has a base with a width at least twice the height of the protrusion.

25. A shock-resistant scintillation detector comprising an elongated metal cylinder containing an elongated scintillation crystal of an alkali metal halide, said crystal being coaxial with said cylinder and extending along the length of the cylinder a distance several times its diameter, a glass window substantially within and closing one end of said cylinder, a deformable optical coupling member between said window and the end of said crystal, a closure member at the opposite end of said cylinder and spaced from the end of said crystal, yieldable means compressed between said closure member and said crystal for biasing said crystal toward said window, a sleeve of soft elastomeric material which is provided throughout its length and circumference with a multiplicity of integral projections which engage the peripheral surface of the crystal and cushion its movements, and finely divided reflective material between said sleeve and the peripheral surface of said crystal.

26. A scintillation detector according to claim 25 wherein said integral projections of the sleeve contact less than 10 percent of the total area of the peripheral surface of said crystal and said reflective material covers the major portion of said peripheral surface.

27. A scintillation detector according to claim 25 wherein an elastic rubber disc is provided in said cylinder having a multiplicity of closely arranged deformable protrusions engaging the end of said crystal and wherein a finely divided reflective material is placed between said disc and said crystal.

28. A scintillation detector according to claim 27 wherein said disc is formed of a silicone rubber containing at least 15 percent by weight of aluminum oxide.

29. A shock-resistant scintillation detector comprising an elongated metal container containing an elongated scintillation crystal of an alkali metal halide, said crystal being coaxial with said container and extending along the length of the container, a transparent window located at and closing one end of said container and spaced from one end of said crystal, a flexible transparent optical coupling member located between and bonded to said crystal and said window, said coupling member having an axial thickness of at least 0.3 inch, a closure member at the opposite end of said container spaced from the other end of said crystal, a yieldable elastic member located between said closure member and said other end of said crystal, a flexible elastomeric sleeve having closely arranged integral inwardly projecting portions along its length which engage and support the peripheral surface of the crystal to locate it substantially coaxial with said cylinder, and reflective material disposed around said crystal in the spaces between the projecting portions of said sleeve.

30. A shock-resistant scintillation detector according to claim 29 wherein said integral projecting portions of the sleeve normallly engage up to 5 percent of the total area of the peripheral surface of said crystal and said reflective material covers the major portion of said peripheral surface.

31. A hermetically-sealed, shock-resistant scintillation detector comprising an elongated metal container containing an elongated scintillation crystal of an alkali metal halide, said crystal being coaxial with said container and extending along the length of the container, a transparent glass window substantially within and closing one end of said container and spaced from one end of said crystal, a flexible silicone rubber optical coupling member located between and bonded to said crystal and said window, said coupling member having an axial thickness of at least 0.3 inch and having a high light transmittance at a wavelength of 3,000 to 5,000 Angstroms, a closure member at the opposite end of said container spaced from the other end of said crystal, a yieldable elastic member at least slightly compressed between said closure member and said other end of said crystal, a flexible elastomeric sleeve having a multiplicity of integral inwardly projecting portions along its length which contact and support the peripheral surface of the crystal to locate it substantially coaxially with said cylinder, and reflective material disposed in the spaced between the projecting portions of said sleeve and said crystal.

* * * * *